United States Patent [19]

Ikeda et al.

[11] Patent Number: 5,066,141

[45] Date of Patent: Nov. 19, 1991

[54] ELECTRONIC CLINICAL THERMOMETER

[75] Inventors: Makoto Ikeda; Makoto Toriumi, both of Nakai, Japan

[73] Assignee: Terumo Kabushiki Kaisha, Tokyo, Japan

[21] Appl. No.: 593,016

[22] Filed: Oct. 4, 1990

[30] Foreign Application Priority Data

Oct. 5, 1989 [JP] Japan .................................. 1-258799

[51] Int. Cl.$^5$ .......................... G01K 7/00; G01K 3/04; G06F 15/42
[52] U.S. Cl. .................................... 374/169; 364/557; 128/736; 374/172
[58] Field of Search ............... 374/102, 103, 107, 169, 374/172; 364/557; 128/736

[56] References Cited

U.S. PATENT DOCUMENTS

| | | | |
|---|---|---|---|
| 3,978,325 | 8/1976 | Goldstein et al. | 374/169 |
| 4,541,734 | 9/1985 | Ishizaka | 374/169 |
| 4,592,000 | 5/1986 | Ishizaka et al. | 364/557 |
| 4,629,336 | 12/1986 | Ishizaka | 364/557 X |
| 4,648,055 | 3/1987 | Ishizaka et al. | 364/557 |
| 4,811,198 | 3/1989 | Ota et al. | 364/557 X |
| 4,843,577 | 6/1989 | Muramoto | 364/557 |
| 4,866,621 | 9/1989 | Ono | 364/557 X |
| 4,878,184 | 10/1989 | Okada et al. | 364/557 |

FOREIGN PATENT DOCUMENTS 161029   7/1987  Japan .................................. 364/557

*Primary Examiner*—William A. Cuchlinski, Jr.
*Assistant Examiner*—G. Bradley Bennett
*Attorney, Agent, or Firm*—Staas & Halsey

[57] ABSTRACT

An electronic clinical thermometer of the present invention can maintain a high precision of prediction in a wider range of changes in temperature by storing a plurality of prediction methods and setting a prediction method for the equilibrium temperature in accordance with changes in detected temperature with the passage of time.

15 Claims, 11 Drawing Sheets

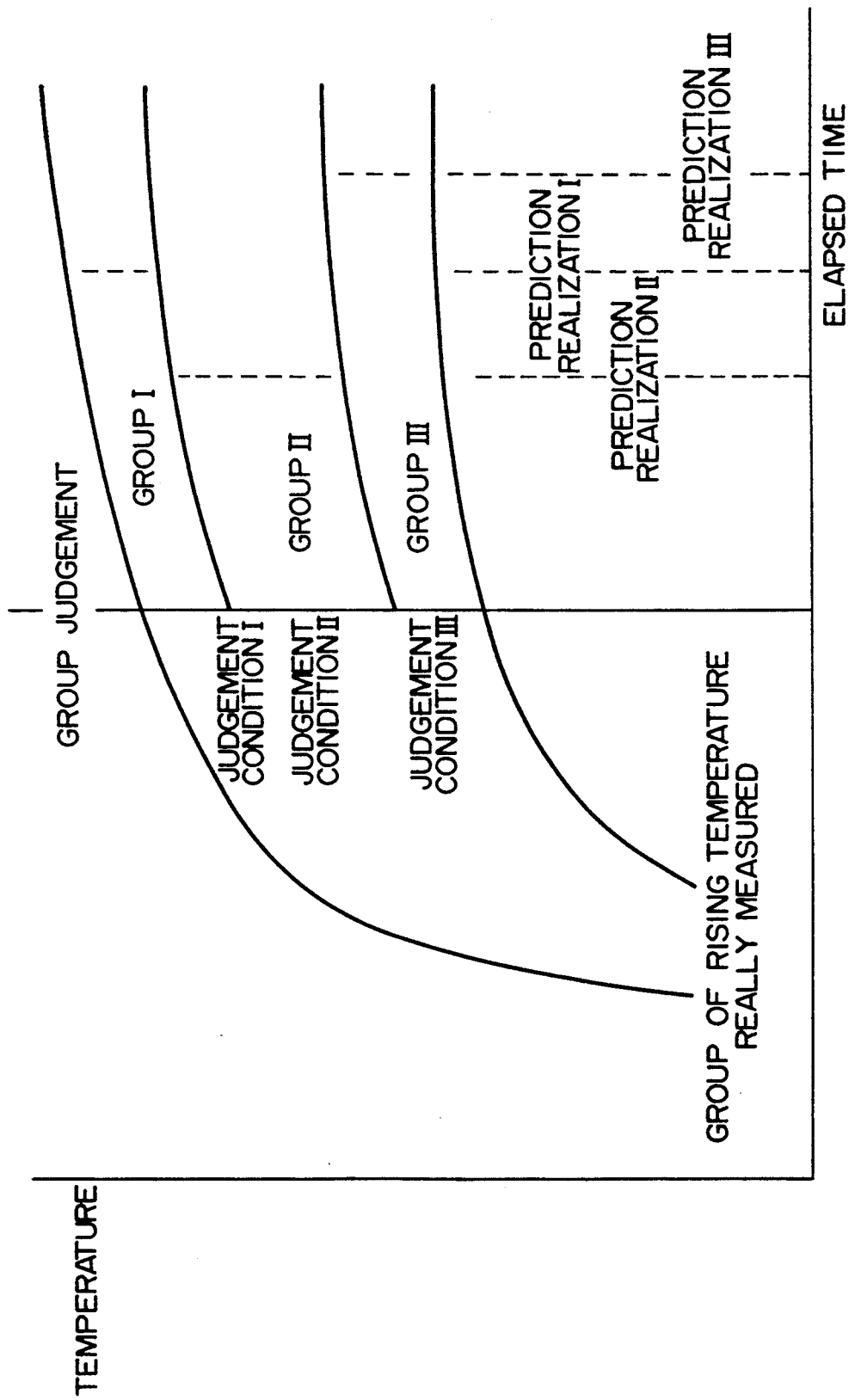
F I G. 10

ELECTRONIC CLINICAL THERMOMETER

BACKGROUND OF THE INVENTION

1. Field of the Invention

The present invention relates to an electronic clinical thermometer, and more particularly to a predictive electronic clinical thermometer.

2. Description of the Related Art

Conventional predictive electronic clinical thermometers predict the equilibrium temperature by using specific predictive operational expressions and prediction realization conditions. Although some thermometers change parameters of the predictive operational expressions according to changes with the passage of time, no thermometer changes the predictive operational expressions or prediction realization conditions themselves.

However, although a precise prediction is possible under a fixed condition, the precision of the prediction is lowered if the measurement environment, such as a person to be measured and the room temperature, is changed.

SUMMARY OF THE INVENTION

An object of the present invention is to provide an electronic clinical thermometer which removes the above conventional defect and maintains a high precision of prediction in a wide range of changes in temperature.

In order to achieve the above object, an electronic clinical thermometer of the present invention comprises temperature detection means for detecting the temperature of a region to be measured, memory means for storing a plurality of methods of predicting the equilibrium temperature, prediction method setting means for setting one of the methods of predicting the equilibrium temperature in accordance with changes in the detected temperature with the passage of time, and predictive operation means for predictively calculating the equilibrium temperature by the set prediction method based on the detected temperature.

The prediction method setting means cyclically or irregularly sets the prediction method once or several times before or during the predictive operation.

Furthermore, the prediction method setting means classifies states of the change in the temperature of the region to be measured in accordance with the change in the detected temperature with the passage of time, and sets an operational expression and/or a prediction realization condition for the equilibrium temperature in accordance with the classification.

In such a composition, a precise predictive equilibrium temperature can be obtained by setting a prediction method in accordance with changes in detected temperature with the passage of time before or during a predictive operation.

According to the present invention, it is possible to provide an electronic clinical thermometer which maintains a high precision of prediction in a wide range of changes in temperature.

Other objects, compositions and advantages will be apparent from the following description with reference to the accompanying drawings.

BRIEF DESCRIPTION OF THE DRAWINGS

FIGS. 7 to 10 are views explaining examples of prediction methods; and

DESCRIPTION OF THE PREFERRED EMBODIMENTS

Figure 1:
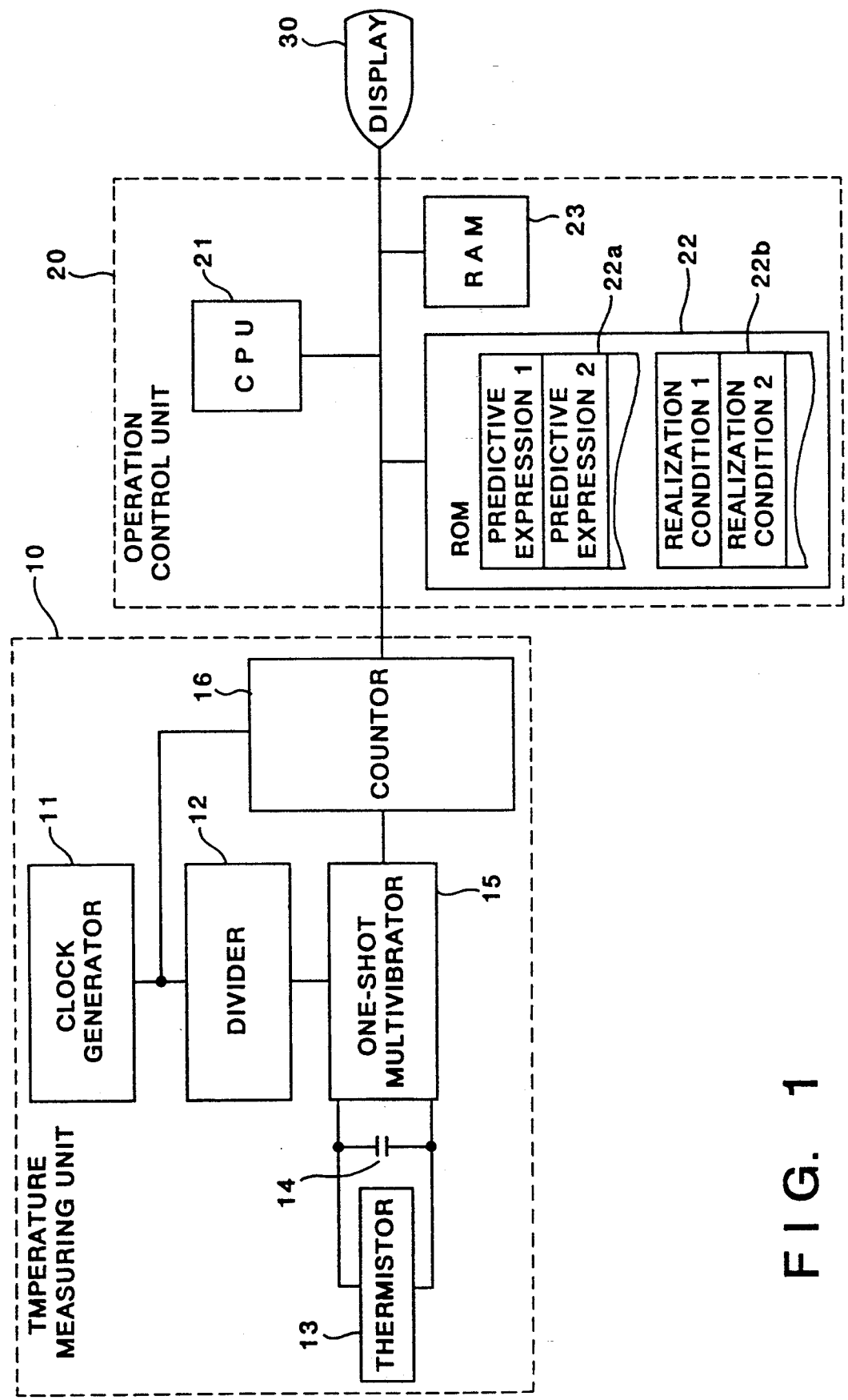
FIG. 1 is a block diagram showing the composition of an electronic clinical thermometer of an embodiment.

An electronic clinical thermometer of an embodiment will now be described in detail. FIG. 1 is a block diagram showing the composition of the electronic clinical thermometer of this embodiment. The electronic clinical thermometer is comprised of a temperature measuring unit 10 for measuring the temperature and outputting the temperature in digital values, an operation control unit 20 for calculating a predictive temperature based on the measured temperature and controlling the electronic clinical thermometer, and a display unit 30 for displaying a measurement result.

The temperature measuring unit 10 comprises a thermistor 13 and a capacitor 14 connected in parallel and disposed in a temperature sensing portion, a one-shot multivibrator 15 for taking one shot according to time constants of the thermistor 13 and the capacitor 14, a clock generator 11 for generating reference clocks, a divider 12 for dividing the reference clocks, and a counter 16 for counting the number of clocks from the clock generator 11 while outputs from the one-shot multivibrator 15 are on a high level. When the number of counts of the counter 16 changes according to the temperature of the thermistor 13, the temperature is output as the digital amount. This composition of the temperature measuring unit 10 is an example, and the composition of the temperature measuring unit of the present invention is not limited to this example.

The operation control unit 20 comprises a CPU 21 for controlling operation, a ROM 22 including a memory portion 22a for storing a control program and predictive expressions 1, 2, . . . used in the electronic clinical thermometer, a realization condition memory portion 22b for storing realization conditions 1, 2, . . . , and a RAM 23 for auxiliary memory and for storing measured temperatures in time series. The operation unit 20 sets a predictive expression and a realization condition, performs predictive operation, and controls operations of the electronic clinical thermometer.

Figure 2:
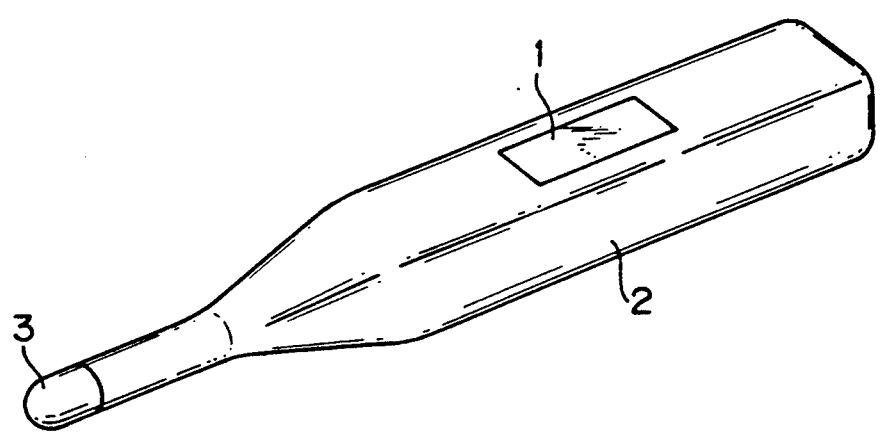
FIG. 2 is an exterior view of a body of the electronic clinical thermometer of the embodiment.

FIG. 2 is an exterior view of the electronic clinical thermometer. The body of the electronic clinical thermometer is composed of a liquid crystal display (LCD) 1 corresponding to the the display unit 30, a case 2, and a metallic tip cap 3 for conducting the temperature to the thermistor 13 shown in FIG. 1.

Figure 3:
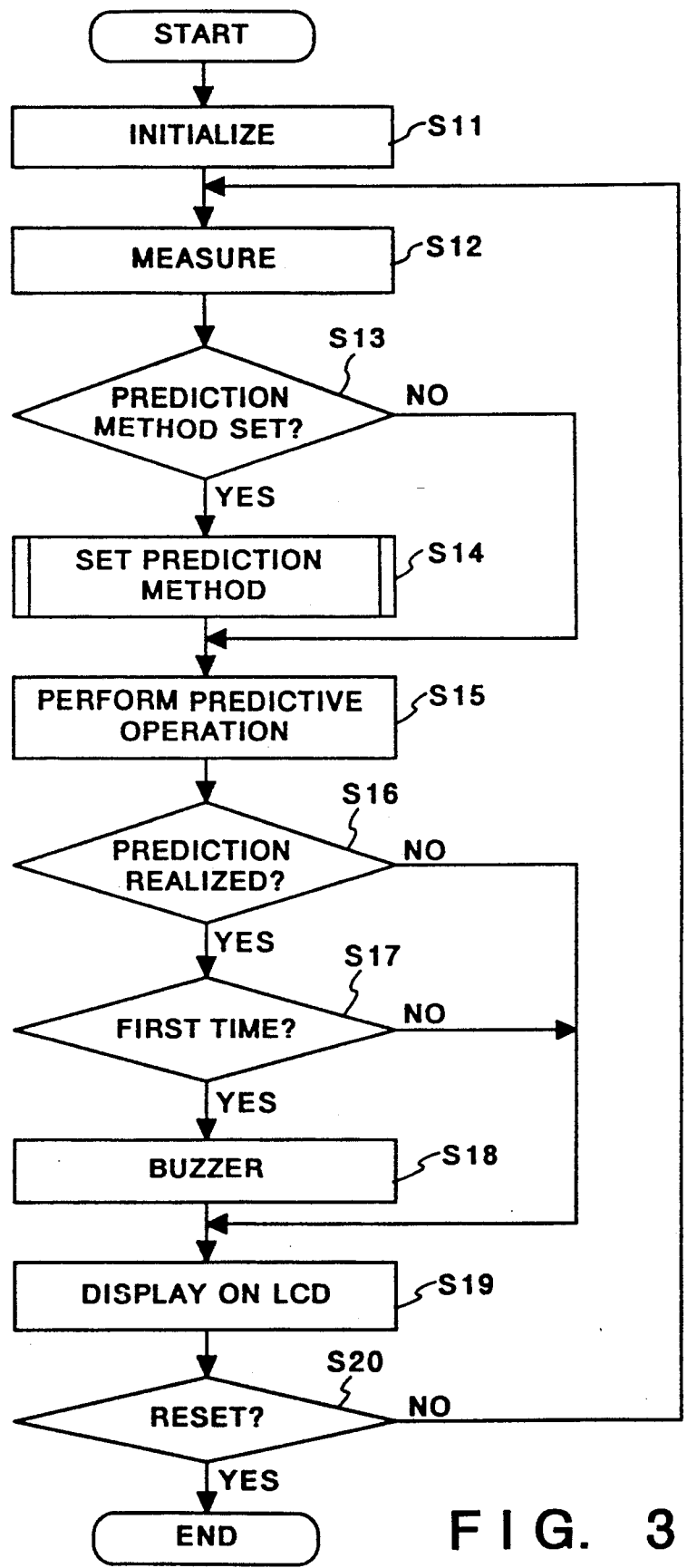
FIG. 3 is a flowchart showing procedures of controlling the whole electronic clinical thermometer of the embodiment.

FIG. 3 is a flowchart showing the operation of the whole electronic clinical thermometer. The realization of prediction occurs when a condition is satisfied indicating that a prediction having sufficient precision can be obtained using a selected prediction method.

When the power is turned on by a predetermined start switch, for example, by removing a magnetic cap, initialization is performed in Step S11. A predetermined prediction method may be set, or a first measure value may be displayed in Step S11.

In Step S12, data from the temperature measuring unit 10 is stored with the passage of time. It is judged in Step S13 whether or not a prediction method is set based on the rise in temperature up to this time. If a method is to be set (i.e. changed), a prediction method suitable for the rise in temperature is set in Step S14.

As described below, in this embodiment, the state of the rise in temperature is checked 30 seconds after the measurement is started and the prediction realization condition is changed at that time. However, this is only an example in which the present invention is carried out. The prediction method may be set a plurality of times, in an extreme way, with each measurement of temperature; or only in the case in which the temperature rise curve departs from a predetermined range. As a prediction method to be set, a predictive expression and a prediction realization condition are given.

When the prediction method is set in Step S14, a predictive operation is performed in Step S15 based on the selected predictive expression, and it is checked in Step S16 whether the selected prediction realization condition is satisfied. When changing the prediction method in Step S14, the predictive expression and the prediction realization condition may be selected, or one of them may be selected to be changed.

If the prediction realization condition is not satisfied, the predicted temperature is displayed on the LCD in Step S19 and the measurement is continued, returning from Step S20 to Step S12. If the prediction is realized, proceeding from Step S16 to S17, it is checked whether or not the prediction is realized for the first time. If it is the first realization, a buzzer for signalling the realization is sounded in Step S18. If it is not the first realization, the predictive temperature is displayed on the LCD in Step S19 without sounding a buzzer and the measurement is started again returning from Step S20 to Step S12. The measurement is repeated and ends when the measurement is reset, for example, when the clinical thermometer is taken out of the region to be measured.

Several examples of the prediction method setting in Step S14 will now be described.

Figure 4:
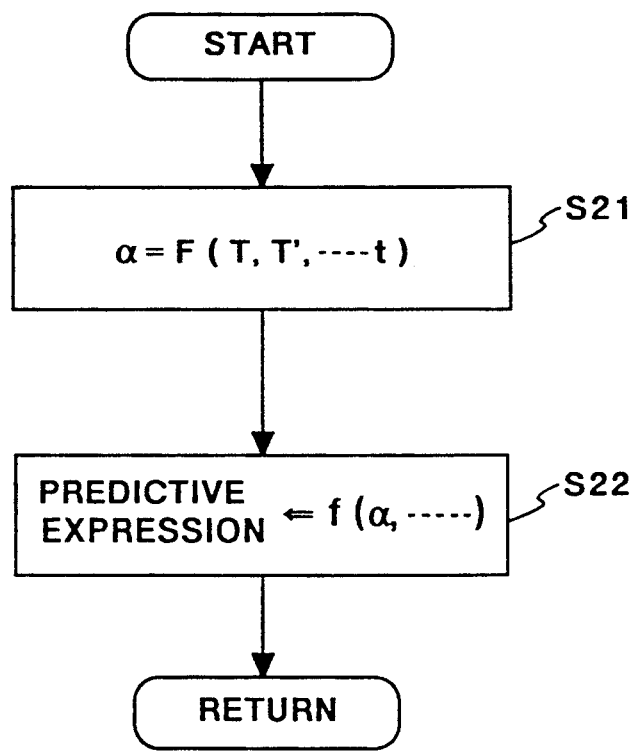
FIG. 4 is a conceptual view of a first prediction method setting.

FIG. 4 shows a first example of selecting the prediction method for a detected temperature. A variable $\alpha$ is found as a function of the temperature T, the differential coefficient T' and so on measured up to this time t in Step S21, and a function f in which the variable $\alpha$ is used as a parameter is determined in Step S22 and used as a predictive expression. $F(T, T', T'', \ldots, t)$ is a form of the function in which the time t, the temperature T(t), the differential coefficient T'(t) and the second-order differential coefficient T''(t) at the time t and other parameters are variables. Table 1 shows examples of the functions, which can be used for function F. The function f is an optional function having the variable $\alpha$ as one of its variables. The shape of the function f as a predictive expression is determined by determining the variable $\alpha$, and is used for the predictive operation. If other unknown quantities, such as a prediction realization condition, are necessary for the predictive operation, they are similarly determined with the variable $\alpha$ as a parameter.

TABLE 1

Examples of Functions F and G $a \times T'(t) + b \times T''(t)$
$a \times T'(t) + b \times T''(t) + \ldots$
$T(t) + a \times T'(t)$
$T(t) + a \times T'(t) + b \times T''(t)$
$T(t) + a \times T'(t) + b \times T''(t) + \ldots$
$T'(t)/t$
$a \times T'(t)/T(t)$
$a \times T''(t)/T'(t)$
$T(t) + T'(t)/t$
$T(t) + a \times T'(t)/T(t)$
$T(t) + a \times T''(t)/T'(t)$
$T(t1) + a \times T'(t2)/T'(t3)$
$T(t1) + a \times T''(t2)/T'(t3)$
$\text{EXP}\{T'(t)\}$
$\text{EXP}\{T'(t) + a \times T''(t)\}$
$\text{EXP}\{T'(t)/T(t)\}$
$\text{EXP}\{T''(t)/T'(t)\}$
...

TABLE 2

Examples of gi($1 \pm i \pm n$)

$a(i) \times T(t) + b(i)$
$T'(t) + a(i) \times T''(t)$
$a(i) \times t + b(i)$
$\text{EXP}(a(i) \times T(t))$
$a(i)$
...

In Tables 1 and 2, a and b are optional constants. In the different examples, the variables having the same name do not have the same content. Values t1, t2 and t3 may be different from each other or the same as each other. In order to set the prediction method simply, a predictive operation can be performed at a fixed time determined in accordance with the variable $\alpha$ or the classification.

Figure 5:
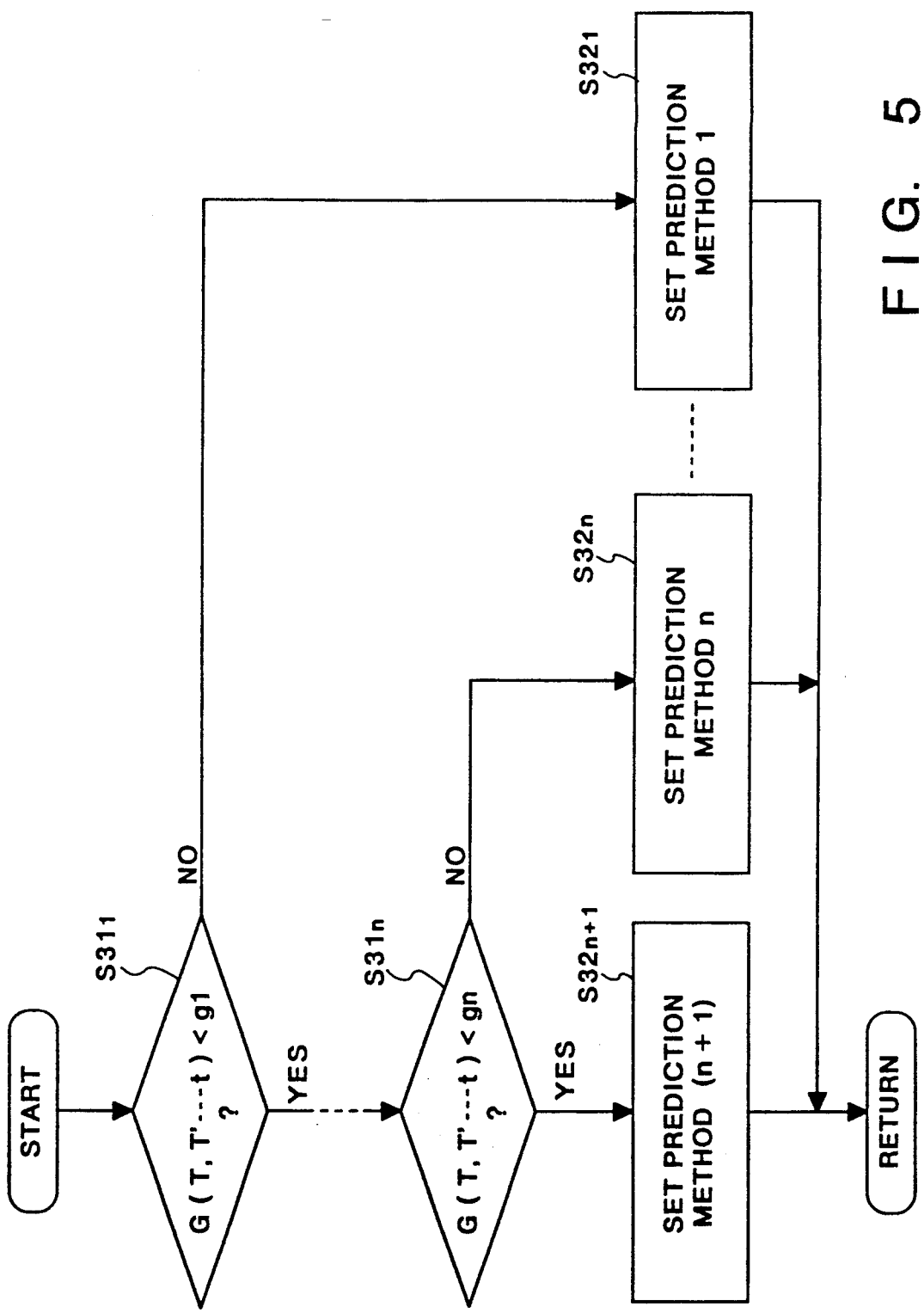
FIG. 5 is a conceptual view of a second prediction method setting.

FIG. 5 shows a second example of selecting the prediction method. In Steps S311 to S31n, prediction methods in Steps S321 to S32n+1 are selected in accordance with the range of a value of a function G by comparing the function G of the temperature T, the differential coefficient T' and so on measured up to this time t with values gi. The function $G(T, T', T'', \ldots, t)$ is an optional function in which the time t, the temperature T(t), the differential coefficient T'(t) and the second-order differential coefficient T''(t) at the time t and other parameters are variables, and examples of the function are given in Table 1. Values g, ..., gn may be obtained by functions of variables (n is a natural number, and $g1 \geq \ldots \geq gn$) and examples thereof are shown in Table 2. In the prediction methods 1, ..., n, different predictive expressions may be used, or only parameters or prediction realization conditions may be changed in the same expression.

Figure 6:
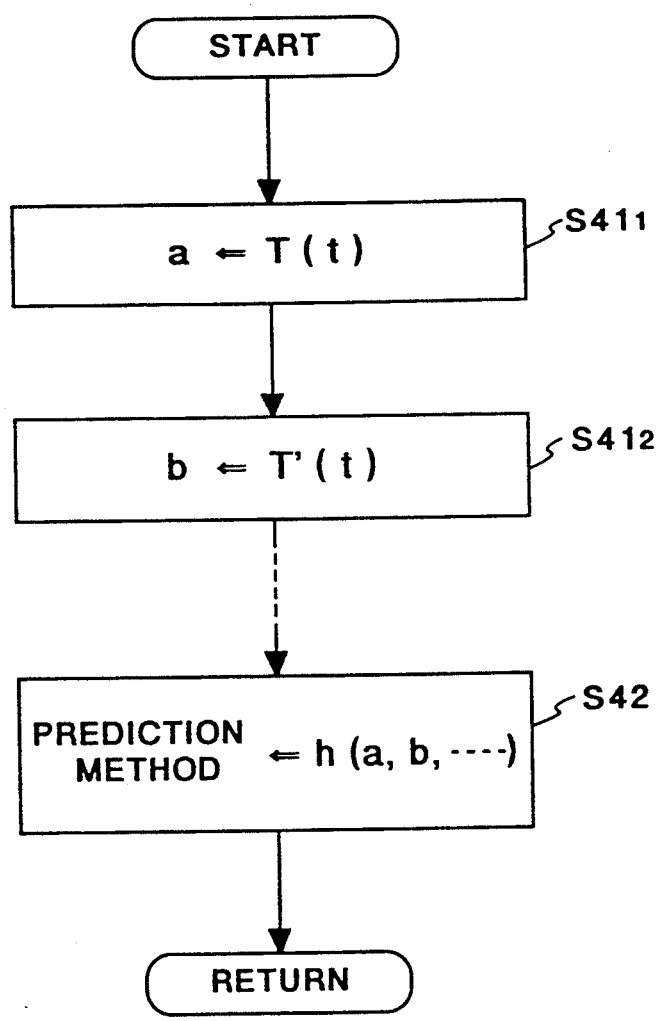
FIG. 6 is a conceptual view of a third prediction method setting.

FIG. 6 shows a third example of selecting the prediction method. In Steps S411, S412, ..., values of each variable are found and a prediction method is determined by a map h from these variables in Step S42. When one value y of a set Y corresponds to one optional value (a constituent) of a set X, this correspondence is called a map from X to Y. The map h(a, b, ... ), which is an optional map of 1 to 1 or a plurality to 1, provides a correspondence from a value of a set of variables, which is composed of one or several variables, to a value of a set of prediction methods. Therefore, one prediction method corresponds to one set of variables, for example, a set of one or several variables selected from the time t, the temperature T(t), the differential coefficient T'(t) and the second-order differential coefficient T"(t) at the time t and other parameters. The prediction method is determined by this map. In the prediction method, different expressions may be used, or only parameters or prediction realization conditions may be changed in the same expression.

A more specific example of this embodiment will now be described in detail with reference to FIGS. 7 to 10. The prediction method of a typical predictive electronic clinical thermometer is as follows. When the time is t and the detected temperature is T, a predictive equilibrium temperature at the time t is given, for example, as follows:

$$Y(t) = T(t) + U(t)$$

$$U(t) = \left(a\frac{dT}{dt} + b\right)t + \left(c\frac{dT}{dt} + d\right)$$

$$a = 0.04321, b = 0.38085$$
$$c = -0.00014, d = 0.17734$$

The condition upon which the prediction is judged to have a sufficient accuracy (the prediction realization condition) is found, for example, as follows:

$$\frac{dT}{dt} = 0.300/20 \, (°C./sec)$$

When the prediction is realized, the buzzer indicates realization of the prediction to the person whose temperature is being taken.

However, since the above method treats all data on detected temperature in the same manner, but only the accuracy of standard data can be assured. Therefore, in order to perform an accurate prediction for a wider range of data, it is necessary to change prediction methods in accordance with the data. An example of such a change in the prediction methods is described below.

Figure 7:
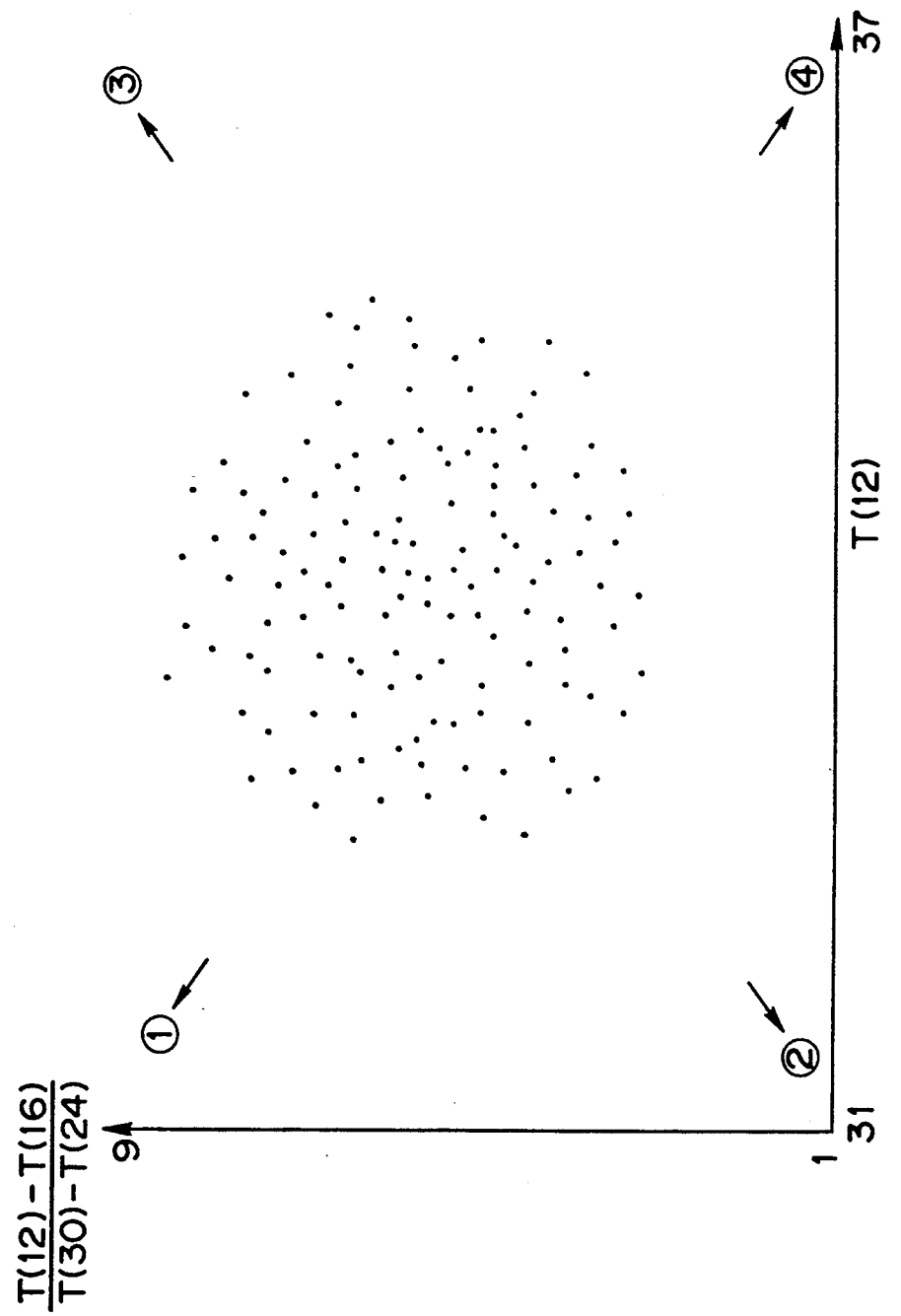
Figure 8:
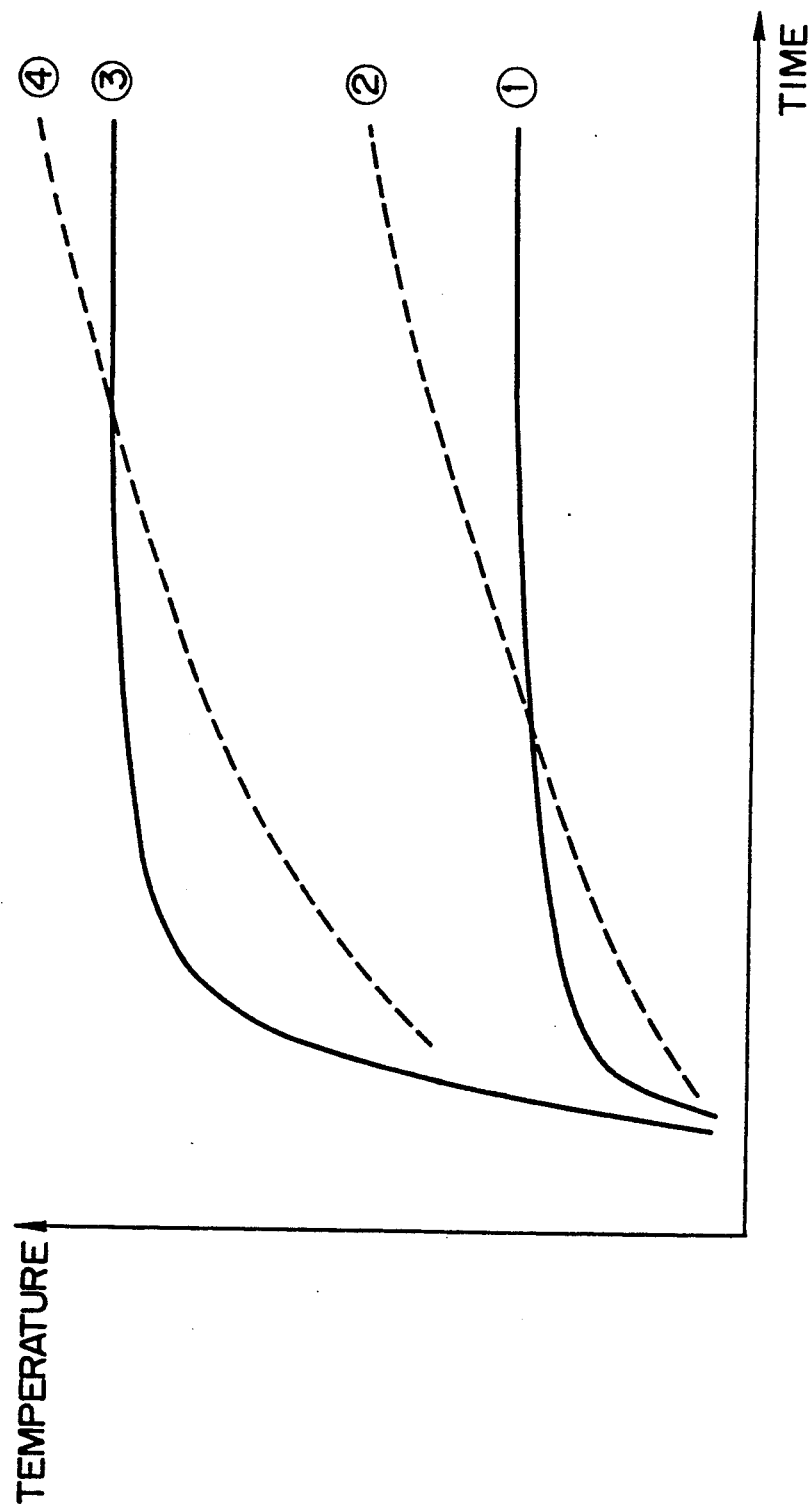

Much data on temperature is arranged using values T(6), T(12), T(24) and T(30) in the graph shown in FIG. 7 where T(t) is the temperature measured at time t during trials using varying conditions. In this example, the vertical axis represents the following value corresponding to the ratio of the differential coefficients:

$$\frac{T(12) - T(6)}{T(30) - T(24)}$$

Since the process is performed by a processor the interval between samples used in the differential coefficients is approximately 6 seconds. If the interval is too short, errors caused by differences in the regions to be measured and so on cannot be covered, and if the interval is too long, the data is averaged and features cannot be drawn out. A proper interval is approximately 4 to 20 seconds. In this example, the interval of 6 seconds is used.

The numerator in the ratio of the differential coefficients includes information on the rise of data at an early time. If the time is too early, it is not appropriate since too big an influence is exerted by the initial conditions for starting the measurement and so on. The proper range of the duration of the measurement up to this time is 10 to 40 seconds. The time of 12 seconds is used in this example. The denominator includes information at a time when the temperature has risen to some extent and changes in the rise rate of temperature stop. Although it is not significant if the time of the denominator is close to the time of the numerator, if the time is too late, the values of the data are averaged and the characteristics thereof cannot be drawn out. A proper range of the time is 30 to 60 seconds. The time of 30 seconds is used in this example. The changes in the data with the passage of time (the shape of the whole data) can be found by taking the ratio between the times.

The horizontal axis represents the temperature corresponding to a predetermined elapsed time and the temperature 12 second after starting is used in this example. If the time of measurement is too early, the initial conditions for measurement and so on have too big an influence, and if the time is too late, the values of the data are averaged. It is necessary to adopt a characteristic temperature for each data. The proper range of time is 10 to 60 seconds, and the time of 12 seconds is used in this example.

FIG. 7 shows information on the shape and the position of the data. Referring to FIG. 7, points near ① correspond to the data shown by the curve ① in FIG. 8, and other points near ②, ③ and ④ relate to corresponding labeled curves in FIG. 8. Thus, since each group of data has characteristics, it is necessary to set a prediction method in accordance with the characteristics of each group.

Figure 9:
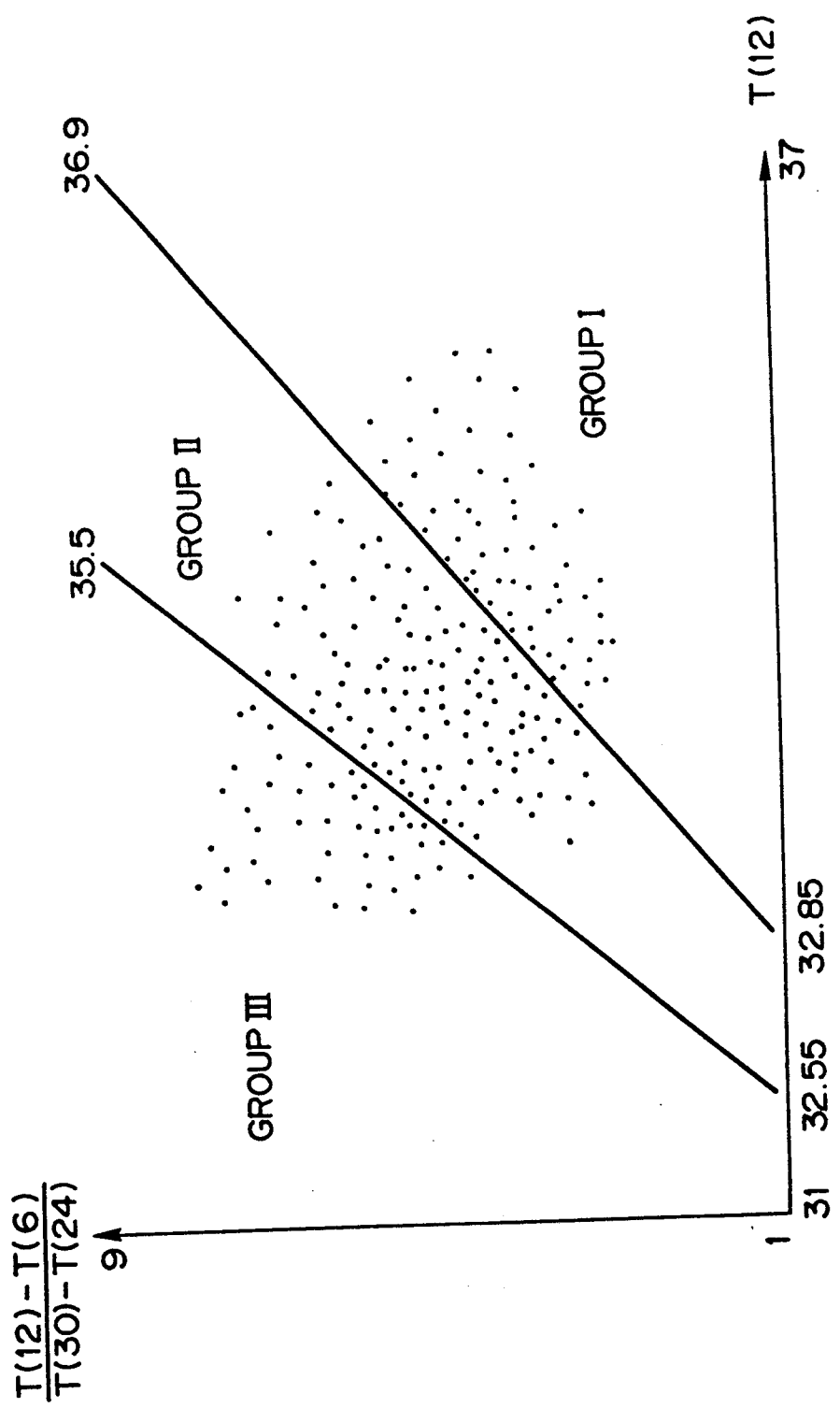

After experiments of the relationship between the useful predictive operational expressions and prediction realization conditions on one hand and the position of the points in FIG. 7 are repeated, the points in FIG. 7 are classified into groups corresponding to whether a difference between prediction value and actual value is less than a predetermined value or not. Using one set of data points, it has been that the data can be classified into three parts by two lines, one line passing through points (35.5,9) and (32.55,1) and another line passing through points (36.9,9) and (32.85,1). The three parts are called Group I, Group II and Group III respectively and are shown in FIG. 9. The two lines correspond to a curve for separating Groups I and II and a curve for separating Groups II and III shown in FIG. 10. Specifically, proper conditions for forming groups can be found using the procedure described above. In this example, the above two straight lines for forming the groups are obtained based on the degree of influence of the changes in the measurement environment, such as the person to be measured and the room temperature, on the precision of prediction.

The determination of a prediction method corresponding to each group will now be described.

Selection of the prediction realization conditions

Figure 11:
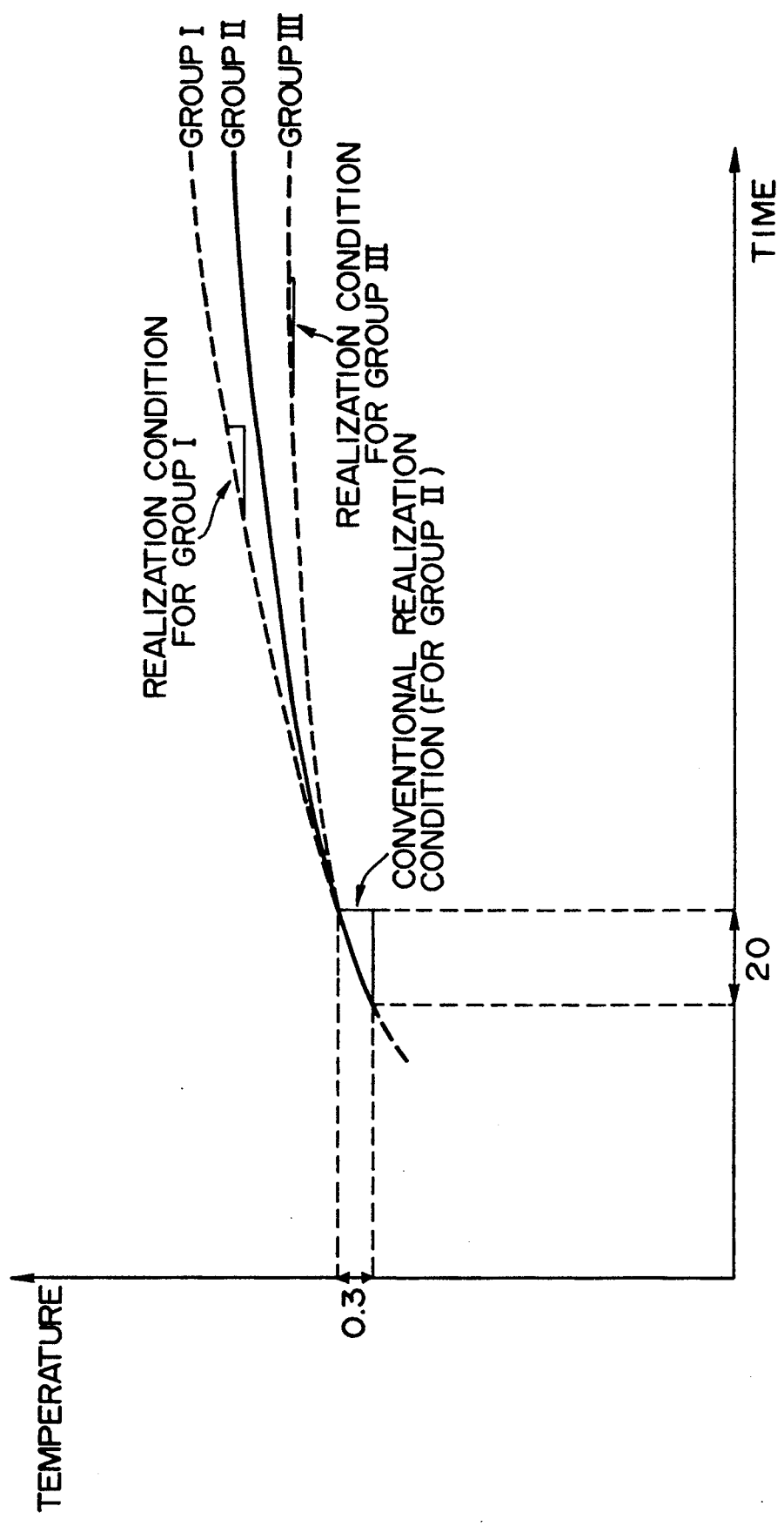
FIG. 11 is a view showing the rise in temperature in a conventional thermometer.

Group II is assumed to be composed of standard data, and therefore, a conventional prediction method is used for Group II. Since the rise in temperature becomes small relatively early in Group III, changes after the prediction condition is realized are likely to be too big for the conventional prediction method. In Group I, changes in the rise rate of temperature are small and changes after the prediction condition is realized are likely to be smaller than those of Group III in the conventional method. Therefore, as shown in FIG. 11, the conventional predictive expressions and prediction realization conditions cannot come up with the changes after the prediction is realized. Then the prediction realization condition (0.300° C./20 sec) of Group II is left as is and the prediction realization conditions of both of Groups I and III are made smaller than those of Group II.

Since the rise in temperature becomes small relatively early in Group III, the prediction realization condition of Group III uses a small value. For example:

$$_{dt}{}^{dT} = 0.140/20 \ (°C./sec)$$

In Group I, if the same condition as that in Group III is used, the precision is further enhanced. However, since the change in temperature is not as great as that in Group III and since it takes too much time to reach the prediction realization condition, a moderate value between the values of Groups II and III is used. For example:

$$_{dt}{}^{dT} = 0.180/20 \ (°C./sec)$$

In a real measurement of temperature, after the detected temperatures are stored, the following equation is solved:

$$\Delta T = \frac{T(12) - T(6)}{T(30) - T(24)}$$

Referring to FIG. 9, when the vertical axis is y and the horizontal axis is x, the two lines shown in FIG. 9 are found as follows:

$$y = 2.71x - 87.3$$

$$y = 1.98x - 63.9$$

Therefore, the real data can be classified as follows:

$$\Delta T > 2.71 \times T(12) - 87.3 \rightarrow \text{Group III}$$
$$\Delta T < 1.98 \times T(12) - 63.9 \rightarrow \text{Group I}$$
$$\text{Others} \rightarrow \text{Group II}$$

This classification corresponds to the classification shown in FIG. 10 and is performed T(30) seconds after.

Subsequently, the prediction realization condition is changed in accordance with the group. This is a map method of the third example in the embodiment. In other words, one group of variables of the vertical and horizontal axes corresponds to one prediction method (predictive expression and prediction realization condition). By adopting this method, a high precision of prediction can be maintained in a wider range of changes in temperature.

Although the vertical axis represents the value corresponding to the ratio of differential coefficients (in reality, the ratio of differentials), a simple differential value may be used in order to facilitate the processing by the microcomputer. In this method, only numerators are used without taking the ratio of differential values.

Selection of the predictive operational expressions

In addition to the selection of the prediction realization conditions, the selection of the predictive operational expressions is performed as follows.

When the predictive operational expression is $$Y(t) = T(t) + U(t)$$

$$U(t) = \left(a\frac{dT}{dt} + b\right)t + \left(c\frac{dT}{dt} + d\right),$$

if Group I $a = 0.04103, b = -0.71931,$ $c = -0.00813, d = 0.864;$ if Group II $a = 0.04321, b = 0.38085,$ $c = -0.00014, d = 0.17734;$ if Group III $a = 0.05441, b = -0.49832,$ $c = -0.00532, d = 0.79982.$ When the predictive operational expression is $$Y(t) = T(t) + U(t)$$

$$U(t) = \left(a\frac{dT}{dt} + b\right)t + \left(c\frac{dT}{dt} + d\right) + e;$$

$a = 0.04321, b = 0.38085,$
$c = -0.00014, d = 0.17734;$ if Group I $e = -0.06;$ if Group II $e = 0;$ if Group III $e = +0.07.$ The selection of the prediction realization conditions is the same as the above-mentioned embodiment in above two examples of the selection of the predictive operational expressions.

As described above, an electronic clinical thermometer of this embodiment has a temperature detection means for detecting the temperature of a region to be measured, an operation circuit for setting a prediction method in accordance with changes in the detected temperature with the passage of time and predicting the equilibrium temperature, and a display for displaying the equilibrium temperature, and can predict a precise equilibrium temperature in a wider range of changes in temperature.

Changes, modifications and additions in the embodiment are possible without departing from the scope of the accompanying claims.

What is claimed is:

1. An electronic clinical thermometer, comprising:
   temperature detection means for detecting temperature in a region to be measured;
   classifying means for classifying states of changes in temperature into a plurality of predetermined groups in dependence upon a change in temperature during a predetermined period prior to a prediction operation;
   memory means for previously storing a plurality of sets corresponding to the predetermined groups of said classifying means, each set including at least one of an operational expression and a prediction realization condition of equilibrium temperature;

prediction method setting means for selecting one of the sets stored in said memory means in accordance with changes in the temperature detected over a passage of time; and predictive operation means for predictively calculating an equilibrium temperature by a prediction method using the set selected by said prediction method setting means and the temperature detected by said temperature detection means.

2. An electronic clinical thermometer according to claim 1, wherein said prediction method setting means sets the prediction method before and during the prediction operation.

3. An electronic clinical thermometer according to claim 2, wherein said prediction method setting means repeatedly sets the prediction method during the prediction operation.

4. An electronic clinical thermometer according to claim 3, wherein said prediction method setting means irregularly sets the prediction method.

5. An electronic clinical thermometer according to claim 1, wherein said prediction method setting means cyclically sets the prediction method.

6. An electronic clinical thermometer according to claim 1, wherein each of the sets stored in said memory means includes at least one prediction realization condition of equilibrium temperature and a corresponding operational expression.

7. A method for detecting an equilibrium temperature, comprising the steps of:

(a) detecting temperature in a region to be measured;

(b) classifying states of changes in temperature into a plurality of predetermined groups in dependence upon a change in temperature during a predetermined period prior to a prediction operation;

(c) storing a plurality of sets prior to performing the prediction operation, each set corresponding to one of the predetermined groups used for classifying in step (b) and including at least one of an operational expression and a prediction realization condition of equilibrium temperature;

(d) selecting one of the sets stored in step (c) in accordance with changes in the temperature detected in step (a) over a passage of time; and (e) predictively calculating the equilibrium temperature by a prediction method using the set selected in step (d) and the temperature detected in step (a).

8. A method of measuring temperature using an electronic thermometer, comprising the steps of:

(a) sampling temperature to produce temperature samples corresponding to different points in time;

(b) selecting one set from among a plurality of sets in dependence upon change in the temperatures samples over time, each set including a prediction method and a prediction realization condition for determining when to use the prediction method; and (c) predicting equilibrium temperature using the prediction method in the set selected in step (b) when the prediction realization condition in the set selected in step (b) is met.

9. A method according to claim 8, wherein said selecting in step (b) is performed in dependence upon a first differential between a first pair of temperature samples having a time interval therebetween of four to 20 seconds.

10. A method according to claim 9, wherein the time interval between the first pair of temperature samples is approximately six seconds.

11. A method according to claim 9, wherein said selecting in step (b) is further performed in dependence upon the first differential divided by a second differential between a second pair of temperature samples obtained in step (a) after the first pair of temperature samples, the second pair of temperature samples having a time interval therebetween of four to twenty seconds.

12. A method according to claim 8, wherein said selecting in step (b) is performed in dependence upon the following ratio $$\frac{T(12) - T(6)}{T(30) - T(24)},$$

where T represents one of the temperature samples and 6, 12, 24 and 30 represent an approximate number of seconds which have passed since initiation of said sampling in step (a).

13. A method according to claim 8, further comprising the step of (d) storing the plurality of sets prior to said sampling, selecting and predicting in steps (a)-(c).

14. A method according to claim 8, wherein the prediction method and the realization condition in each of the sets form a unique set.

15. A method according to claim 14, wherein the prediction method in each of the sets is of the form:

$$U(t) = \left( a \frac{dT}{dt} + b \right) t + \left( c \frac{dT}{dt} + d \right).$$

* * * * *

UNITED STATES PATENT AND TRADEMARK OFFICE
CERTIFICATE OF CORRECTION

PATENT NO. : 5,066,141

DATED : November 19, 1991

INVENTOR(S) : Ikeda et al.

It is certified that error appears in the above-identified patent and that said Letters Patent is hereby corrected as shown below:

Col. 2, line 61, "the" (2nd occurrence) should be deleted.

Col. 4, line 21, "±" (both occurrences) should be --≤--;
line 38, "S311" should be --S31₁--;
line 39, S321" should be --S32₁--;
line 43, "gi" should be --$g_i$--;

line 56, "S411, S412," should be --S41₁, S41₂,--;
line 61, "(a, b,..." should be --(a, b...),--;
line 62, ")," should be deleted.

Col. 5, line 27, "$_{dt}{}^{dT}$" should be -- $\frac{dT}{dt}$ --.

Col. 6, line 9, "second" should be --seconds--;
line 21, "sponding" should be --spondingly--;
line 28, "7 are" (1st. occ.) should be --7 on the other hand are--.

Col. 7, line 5, "$_{dt}{}^{dT}$" should be -- $\frac{dT}{dt}$ --;

line 15, "$_{dt}{}^{dT}$" should be -- $\frac{dT}{dt}$ --.

Signed and Sealed this

Fourth Day of May, 1993

Attest:

MICHAEL K. KIRK

*Attesting Officer*     *Acting Commissioner of Patents and Trademarks*